UNITED STATES PATENT OFFICE.

WALTER J. BUDINGTON, OF PITTSFIELD, MASSACHUSETTS.

CEMENT COMPOUND.

SPECIFICATION forming part of Letters Patent No. 281,965, dated July 24, 1883.

Application filed January 13, 1883. (No specimens.)

*To all whom it may concern:*

Be it known that I, WALTER J. BUDINGTON, a citizen of the United States of America, residing at Pittsfield, in the county of Berkshire and State of Massachusetts, have invented certain new and useful Improvements in the Manufacture of Portland or Hydraulic Cement, of which the following is a specification; and I do hereby declare the following to be a full, clear, and exact description of the invention, such as will enable others skilled in the art to which it appertains to make and use the same.

The nature of my invention consists in the materials used and the process of making hydraulic or Portland cement, as hereinafter set forth.

My cement is made from variegated marble of the second formation, (being in color dark and white,) and a suitable blue clay. This variegated marble is nearly free from magnesia, the presence of which is detrimental to hydraulic cement, in weakening or destroying the bond thereof when used, and should therefore be carefully avoided. I have found by practical tests that white marble is very liable to contain more or less magnesia, and I therefore do not seek to claim what is covered by my patent of August 16, 1881, No. 245,699—to wit, "white marble of the second formation." The material that I use is of an essentially different combination.

The proportions of the variegated marble and blue clay used in forming my cement are preferably as follows: For the first grade of cement seventy-eight per cent. of stone and twenty-two per cent. of clay; for the second grade seventy-six per cent. of stone and twenty-four per cent. of clay; for the third grade seventy-five per cent. of stone and twenty-five per cent. of clay; and for the fourth grade seventy-four per cent. of stone and twenty-six per cent. of clay.

It is obvious that the grades of cement may be increased largely by the use of similar proportions of stone and clay; but it is probable that the second and third grades herein named will be most used. The variegated marble is reduced by suitable machinery to an impalpable powder, and the clay dried and reduced in a like manner. The powdered marble and clay should then be weighed, so as to obtain the desired proportions, then intimately mixed together, after which water is added in sufficient quantity to make a stiff paste. The mass is then molded into any desirable form, (preferably by machinery.) The bricks or forms thus molded are dried preferably in a drying-kiln having a blower attached to produce a blast, and semi-vitrification is produced.

I have found the cement to be much superior to imported cement, and cheaper than Portland cement.

Having fully described my invention, what I claim as new, and desire to secure by Letters Patent, is—

A cement made of variegated marble of the second formation and blue clay mixed in the proportion and in the manner herein set forth.

In testimony whereof I affix my signature, in presence of two witnesses, this 28th day of November, 1882.

WALTER J. BUDINGTON.

Witnesses:
 GEORGE Y. LEARNED,
 THOS. A. OMAN.